*Gray & White,*
*Sawing Stone.*
Nº 14,684. Patented Apr. 15, 1856.
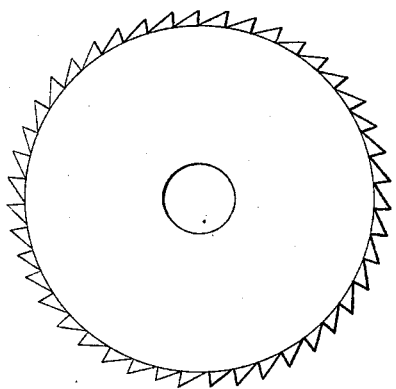
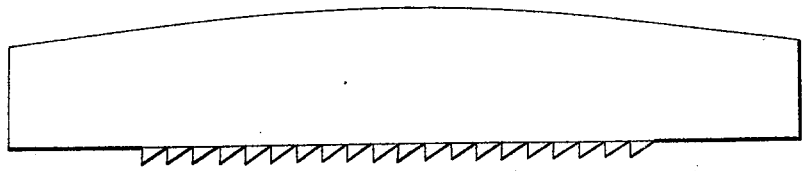

UNITED STATES PATENT OFFICE.

HENRY H. WHITE AND EDWARD A. GRAY, OF EAST POULTNEY, VERMONT.

STONE AND MARBLE SAW.

Specification of Letters Patent No. 14,684, dated April 15, 1856.

*To all whom it may concern:*

Be it known that we, HENRY H. WHITE and EDWARD A. GRAY, of East Poultney, in the county of Rutland and State of Vermont, have invented a new and Improved Saw for Sawing Slate, Marble, and other Kinds of Stone; and we do hereby declare that the following is a full and exact description thereof, reference being had to the accompanying drawings, making part of this specification.

Interest of the simple, straight-edged blade, of soft iron, for sawing stone, with the assistance of sand, now in universal use, we have found and proved by experiment that saws with teeth, of the ordinary forms, for sawing wood, may be used for sawing stone, when said saws, or the teeth thereof, are made of cast-iron chilled. The chilled edges of the teeth, which are harder and will resist abrasion much better, than steel of any degree of hardness, are so durable that we find such saws to be economical and efficient for sawing stone, such as marble, slate, sand-stone and granite, no sand being required to assist the action of the teeth.

The saws may be either straight or circular, as shown in the drawings.

We are aware that notched disks and rollers with chilled projections, have been used for cutting and dressing stone, by rolling them over the same with pressure; but these are not saws, in the true sense of the term, and do not act in the same manner; therefore we do not claim such; but—

What we claim as our invention and desire to secure by Letters Patent as a new manufacture, is—

Cast-iron saws with chilled teeth, for the purpose of sawing stone.

HENRY H. WHITE.
EDWARD A. GRAY.

Witnesses:
   JOHN C. DERBY,
   H. G. NEAL.